(12) United States Patent
Tokizono et al.

(10) Patent No.: US 6,754,019 B2
(45) Date of Patent: Jun. 22, 2004

(54) SYSTEM AND METHOD FOR IMPLEMENTING A ROTARY MEMORY DEVICE

(75) Inventors: Akira Tokizono, Fujisawa (JP); Naoyuki Kagami, Fujisawa (JP); Hiroshi Uchida, Sagamihara (JP); Takashi Kuroda, Yamato (JP)

(73) Assignee: Hitachi Global Storage Technologies Netherlands B.V. (NL)

( * ) Notice: Subject to any disclaimer, the term of this patent is extended or adjusted under 35 U.S.C. 154(b) by 258 days.

(21) Appl. No.: 09/898,822

(22) Filed: Jul. 3, 2001

(65) Prior Publication Data

US 2002/0003676 A1 Jan. 10, 2002

(30) Foreign Application Priority Data

Jul. 7, 2000 (JP) ........................................ 2000-207565

(51) Int. Cl.[7] .............................. G11B 5/09; G11B 5/596
(52) U.S. Cl. .............................. 360/53; 360/31; 360/49; 360/78.06; 360/78.08; 360/78.14
(58) Field of Search ................................. 360/75, 78.12, 360/53, 51, 78.14, 60, 78.06, 78.08, 73.03, 99.08, 31, 49, 130.34

(56) References Cited

U.S. PATENT DOCUMENTS

| | | | | |
|---|---|---|---|---|
| 4,126,887 A | * | 11/1978 | Miyazaki et al. | 360/49 |
| 4,131,838 A | * | 12/1978 | Etoh et al. | 318/603 |
| 4,279,004 A | * | 7/1981 | Yamashita et al. | 360/48 |
| 5,612,830 A | * | 3/1997 | Gregory et al. | 360/69 |
| 5,654,840 A | * | 8/1997 | Patton et al. | 360/75 |
| 6,021,012 A | * | 2/2000 | Bang | 360/51 |
| 6,118,607 A | * | 9/2000 | Jung | 360/53 |
| 6,496,324 B1 | * | 12/2002 | Golowka et al. | 360/78.12 |

FOREIGN PATENT DOCUMENTS

| | | |
|---|---|---|
| JP | 04-106768 | 4/1992 |
| JP | 06-187749 | 7/1994 |
| JP | 09-139034 | 5/1997 |
| JP | 11-045522 | 2/1999 |

* cited by examiner

Primary Examiner—David Hudspeth
Assistant Examiner—Natalia Figueroa
(74) Attorney, Agent, or Firm—Abdy Raissinia; Dillon & Yudell LLP

(57) ABSTRACT

An improved system and method for implementing a rotary memory device, including a host system and a disk-shaped memory medium storing position information, or a servo address mark (SAM). If a head fails to read a valid SAM, a dummy SAM is generated to prevent an arm with a read/write head from entering a neutral state. If the normal state cannot be restored within a fixed number of intervals, the system goes into the emergency brake control mode. In this emergency brake control mode, the direction of the head is determined, and the VCM current is applied in such a way drive the arm in the opposite direction. Damage to the magnetic medium and subsequent data loss problems are reduced because the velocity of the head is reduced to a safe level.

19 Claims, 12 Drawing Sheets

SYSTEM AND METHOD FOR IMPLEMENTING A ROTARY MEMORY DEVICE

BACKGROUND OF THE INVENTION

1. Technical Field

The present invention relates in general to the field of data processing systems and more specifically, to the field of storage media within data processing systems. Still more specifically, the present invention relates to an improved system and method for improving the reliability of storage media within data processing systems.

2. Description of the Related Art

Incorporated in modern data processing systems (e.g., a computer system) are typically storage media implemented as a hard disk drive. Each hard disk drive includes a servo mechanism for read/write head positioning and a disk medium for data storage. The read/write head, herein referred to simply as a "head", reads a set of position information stored on the disk medium to detect the current head position above the disk medium. This set of position information is written on the disk medium in a radial direction and is periodically detected in accordance with a rotation accuracy of the disk medium.

Each set of position information usually includes a servo address mark (SAM), a Gray code, and burst data. The head reads the SAM periodically to trigger a servo locked state. Generally, the address information in a Gray code following the SAM is read in the servo locked state, so that a track position (a cylinder position) of the head is read.

An actuator, implemented as a voice coil motor (VCM) controls the movement of the head arm. The trajectory of the head is calculated from the current address read by the head and a target address. The head follows the track to move to the target address. Generally, because a hard disk drive is designed for maximum performance and a minimum seek time, the maximum velocity of the head reaches 3.3 m/sec during a fast seek operation.

In recent years, the recording density of hard disk drives has been increased. However, this increase in recording density results in a greater occurrence of errors during a position information read. Some factors that contribute to this increase of errors include: stresses caused by ambient conditions (e.g., temperature or a power source), imperfectly written position information, a momentary fault of the head, or a variety of other factors. It is difficult to eliminate every one of these error factors. An error recovery method incorporated into the system can help alleviate some of the error factors. This is especially true for a ramp loading/unloading mechanism recently employed in hard disk drives to improve the impact properties and to prevent the wear of the head. In the ramp loading/unloading mechanism, the head encounters the ramp at a standby position and the head is positioned higher than when the head moves above the disk medium. Consequently, when the head overruns the ramp at a rapid velocity (e.g., at least 1 m/s) due to a seek error, the head collides against the crush stop mechanism positioned at the outer periphery of the ramp. The head rebounds, possibly causing the surface of the disk medium to be damaged.

In conventional hard disk drives, when the head fails to read a SAM, the servo locked state is reset to the servo unlocked state. The VCM output is set in the neutral state to retry the SAM read. Because the VCM is in the neutral state, the head arm continues to move due to its inertia. And, when a Gray code read fails, a state estimator detects Gray code read failure. The state estimator records actual values measured from the disk media and compares the actual value to an estimated value. The state estimator also corrects an estimated value utilizing a difference (estimation error) between a measured value (read Gray code) and the estimated value. The output (an estimated value) of the estimator in the stable state offers enough precision for this application. If a difference from a measured value is greater than a predetermined reference value, the estimated value is utilized. If a Gray code read error is detected, the error may be corrected utilizing the estimated value.

Japanese Published Unexamined Patent Application No. 9-139034 discloses a recovery technique, utilized when a servo error occurs during a fast seek operation. According to the technique disclosed in the official gazette, the driving current is stopped immediately if an estimated velocity exceeds a predetermined reference value and a braking current is applied according to the difference between the estimated velocity and the reference velocity to reduce the head velocity to at least a predetermined safety value before the head collides against the stopper.

Also, Japanese Published Unexamined Patent Application No. 11-45522 discloses a technique for filtering the driving current through an integrator, which generates an integrated deceleration control signal. Integrating the driving current begins at a seek operation when a seek error is detected.

Furthermore, Japanese Published Unexamined Patent Application No. 6-187749 discloses a technique for controlling deceleration of a head of a hard disk drive by changing a normal velocity control signal to a deceleration signal recorded beforehand in a memory circuit when a seek error occurs.

Finally, Japanese Published Unexamined Patent Application No. 4-106768 discloses a technique for controlling a decelerated velocity utilizing a normal time velocity table at a normal time and an abnormal time velocity table at an abnormal time.

However, any of the conventional techniques described above cannot solve such seek errors satisfactorily. The technique that neutralizes the VCM, is not effective when the inertial velocity is over 1 m/sec. If a SAM cannot be read when the VCM is neutralized, permanent damage to the surface of the disk medium may result. In addition, if the SAM is read, it is not certain that the head velocity can be decreased enough in the remaining area.

If a Gray code is misread, the use of the above described state estimator will be effective when the error rate is low. However, the error rate rises unavoidably if an attempt is done to record Gray codes at a higher density, and thereby, the state estimator does not function adequately. If the position of the estimator deviates from an actual position of the head, the use of an estimated velocity value might accelerate the head unexpectedly. In addition, if the estimator determines the actual value read from the disk medium is correct, the head velocity is sometimes accelerated unexpectedly. Such unexpected increase of the head velocity might cause the head to overrun and may result in the generation of abnormal sounds or vibration due to discontinuous VCM outputs.

SUMMARY OF THE INVENTION

To overcome the foregoing and additional limitations of the prior art, the present invention presents an improved system and method for implementing a rotary memory device. The method of the present invention enables a dummy SAM to be generated at a rate that does not reset the servo locked state even when the process of detecting a SAM fails. Consequently, it is possible to control servo interruptions periodically, to attempt to return the head to the normal reading state. Whether or not the SAM is read can be determined by checking whether or not a SAM read signal (smf) is output in a time window (SAM coming window) in which the SAM should be read. If a dummy SAM is generated, a dummy sector interval is utilized as a sector interval to prevent the delay of the next servo gate.

Servo interruptions can thus be controlled normally by generating a dummy SAM even when a SAM fails to be read by the head. If the normal state cannot be restored within a fixed number of intervals, the system goes into the emergency brake control mode. In this emergency brake control mode, the direction of the head is determined, and the VCM current is to drive the arm in the opposite direction. The driving current value and the driving time are predetermined. The output value from the back electromotive force (emf) circuit utilized for the loading/unloading mechanism can control the servo interruptions with feedback control. Damage to the disk medium and subsequent data loss problems are reduced because the velocity of the head is reduced to a safe level.

Even during the emergency brake control mode, attempts are made to read a SAM and corresponding Gray code. If a SAM is detected during the emergency brake control mode, the head can be returned to the normal control mode.

Furthermore, the present invention proposes a method to recover from a Gray code misread. When a Gray code is misread, the head accelerates at a rate that is not expected from the last track position and an unexpected acceleration input value is relayed to the servo controller. Or, the head reads a value much greater or much less than a value estimated by the state estimator. The unexpected values are replaced with the predetermined maximum values, so the servo interruptions are controlled. If an unexpected value utilized for an extended period of time, the system can enter the emergency brake control mode. It is also possible to prevent the hazard counter from being reset when a misread occurs. If a count recorded by the hazard counter exceeds a predetermined safety value, the system enters the emergency brake control mode.

Each of those methods to recover from a Gray code misreading is intended to replace a discontinued current input (electric power application) to the VCM with an input value that can suppress generation of an abnormal sound/vibration from the VCM.

DESCRIPTION OF THE PREFERRED EMBODIMENT

Figure 1:
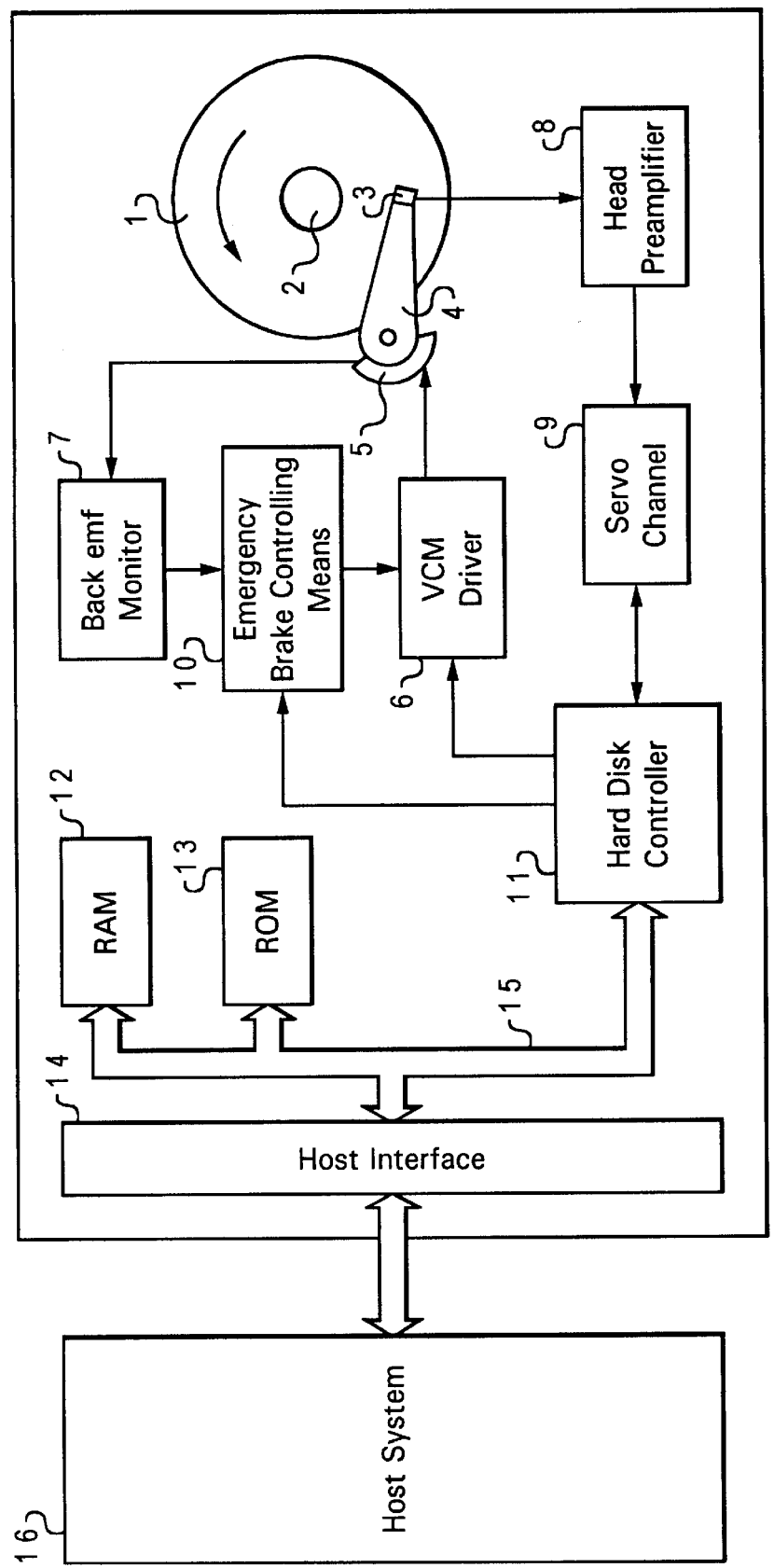
FIG. 1 depicts a block diagram of an exemplary hard disk drive utilized to implement a preferred embodiment of the present invention.

With reference now to the figures, and in particular, with reference to FIG. 1 there is depicted a block diagram of an exemplary hard disk drive that may be utilized to implement a preferred embodiment of the present invention. Included in the hard disk drive is a disk-like magnetic recording medium 1 storing electrically written information, a spindle motor 2 for rotating magnetic recording medium 1, a head 3 for writing/reading information on/from magnetic recording medium 1, an arm 4 for supporting head 3, and a voice coil motor (VCM) 5 implemented as an actuator for driving arm 4. A VCM driver 6 drives voice coil motor 5. A back electromotive force (emf) monitor 7 monitors the back emf of voice coil motor 5. The analog output from the head 3 is amplified by a head preamplifier 8 and relayed to a servo channel 9.

Further included in the hard disk drive is an emergency brake controlling means 10. Emergency brake controlling means 10 will be described later in more detail. Hard disk controller 11 controls the entire hard disk drive. In response to receiving a servo signal from servo channel 9, hard disk controller 11 outputs a driver signal to VCM driver 6. In the emergency braking mode, hard disk controller 11 relays a control signal to emergency brake controlling means 10. Emergency brake controlling means 10 references to the signal output from back emf monitor 7, thereby braking the VCM in the event of an emergency.

Hard disk controller 11 is coupled to a RAM 12, a ROM 13, and a host interface 14 via a bus 15. Host interface 14 controls access to a host system 16. ROM 13 stores programs to be processed by the micro processing unit (MPU) provided in hard disk controller 11 and RAM 12 loads programs stored in ROM 13. RAM 12 also functions as a buffer for data relayed from a disk drive and output to the disk drive.

Figure 2:
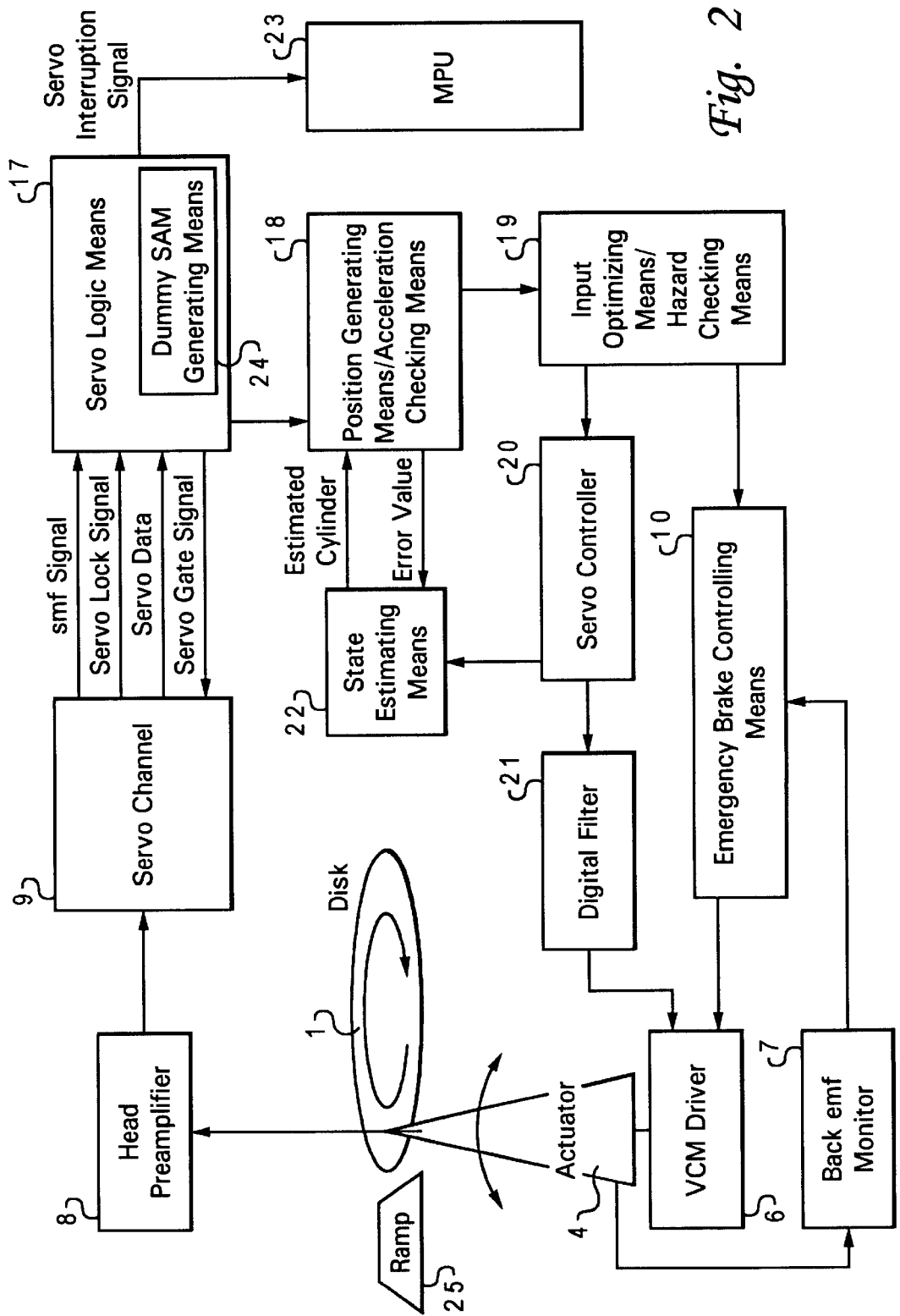
FIG. 2 illustrates a detailed block diagram of a hard disk controller and peripheral members in accordance with a preferred embodiment of the present invention.

Referring to FIG. 2, there is depicted a detailed partial block diagram of hard disk controller 11 and peripheral members. In addition to the members or means described above, the hard disk controller 11 also includes servo logic means 17, position generating means/acceleration checking means 18, input optimizing means/hazard checking means 19, a servo controller 20, a digital filter 21, a state estimator 22, and a micro processing unit (MPU) 23. Many of these members or means are respectively configured with a single chip element and housed in hard disk controller 11. These members or means may also be respectively configured with a discrete element.

Magnetic recording medium 1, herein referred to as medium 1, records position information in a radial direction. Each set of position information includes a servo address mark (SAM), a Gray code, and a burst data. All data on medium 1, including the position information, are read by head 3, amplified by head preamplifier 8, and relayed to servo channel 9.

Servo channel 9 detects a SAM from the analog waveform from head preamplifier 8 and sends an smf (servo address mark found) signal to servo logic means 17. Servo channel 9 decodes a Gray code following the SAM and converts a burst signal from analog to digital. These items are serially transferred to servo logic means 17 via a servo data line. Servo channel 9 is activated by a servo gate signal.

Servo logic means 17 controls an activation timing of servo channel 9 to read a servo pattern (position information) written on medium 1 at designated sampling intervals. Servo logic means 17 generates a position information read based on the information obtained from servo channel 9. In addition, servo logic means 17 generates a servo interruption to MPU 23 and the servo logic means 17 generates a servo locked state at the same time. And, servo logic means 17 monitors the state of the detected SAM in the servo channel. If the SAM is not detected within a predetermined time window (SAM coming window), servo logic means 17 generates a dummy SAM utilizing a dummy SAM generating means 24. Then, servo logic means 17 can generate a servo interruption to the MPU 23.

Position generating/acceleration checking means 18, detects a misread position based on the information sent from servo logic means 17 and the information from state estimating means 22. Position generating/acceleration checking means 18 also calculates a necessary position deviation for feedback control on the based on a target position.

Emergency brake controlling means 10 is activated when a servo pattern (e.g., a SAM) cannot be read. In this case, the head is decelerated to a safe velocity (e.g., less than 0.4 m/sec) according to the last velocity at which the servo pattern is read. To decelerate the head velocity, a fixed current (e.g., 1 A) flows in VCM driver 6. Otherwise, an input from the back emf circuit controls the deceleration of the head.

Back smf monitor 7 measures a back emf applied to the VCM. This measured value can be relayed to the VCM that starts the emergency brake control mode. The measured value enables a head velocity to be measured when a servo pattern is not read.

Input optimizing/hazard checking means 19 checks the output information from the position generating means, thereby suppressing the discontinued output from servo controller 20 provided by a input optimizing/hazard checking means 19. Input optimizing/hazard checking means 19 also determines whether or not the number of head position read errors reaches a predetermined value necessary to switch the control to the emergency braking control mode.

Servo controller 20 stores each parameter of the optimized feedback and feedforward to minimize the seek time required. Servo controller 20 calculates the VCM output of each sample (servo interruption control). Digital filter 21 includes a notch filter for controlling the resonance of a mechanical system.

State estimating means 22 stores parameters determined by an actuator physical model and tests. State estimating means 22 estimates a head position for the next sample (servo interruption) while feeding back the information from the real machine.

MPU 23 controls various items according to the micro codes stored in RAM 12 or ROM 13. MPU 23 has a servo controlling function executed according to an interruption signal from the servo logic.

Figure 3:
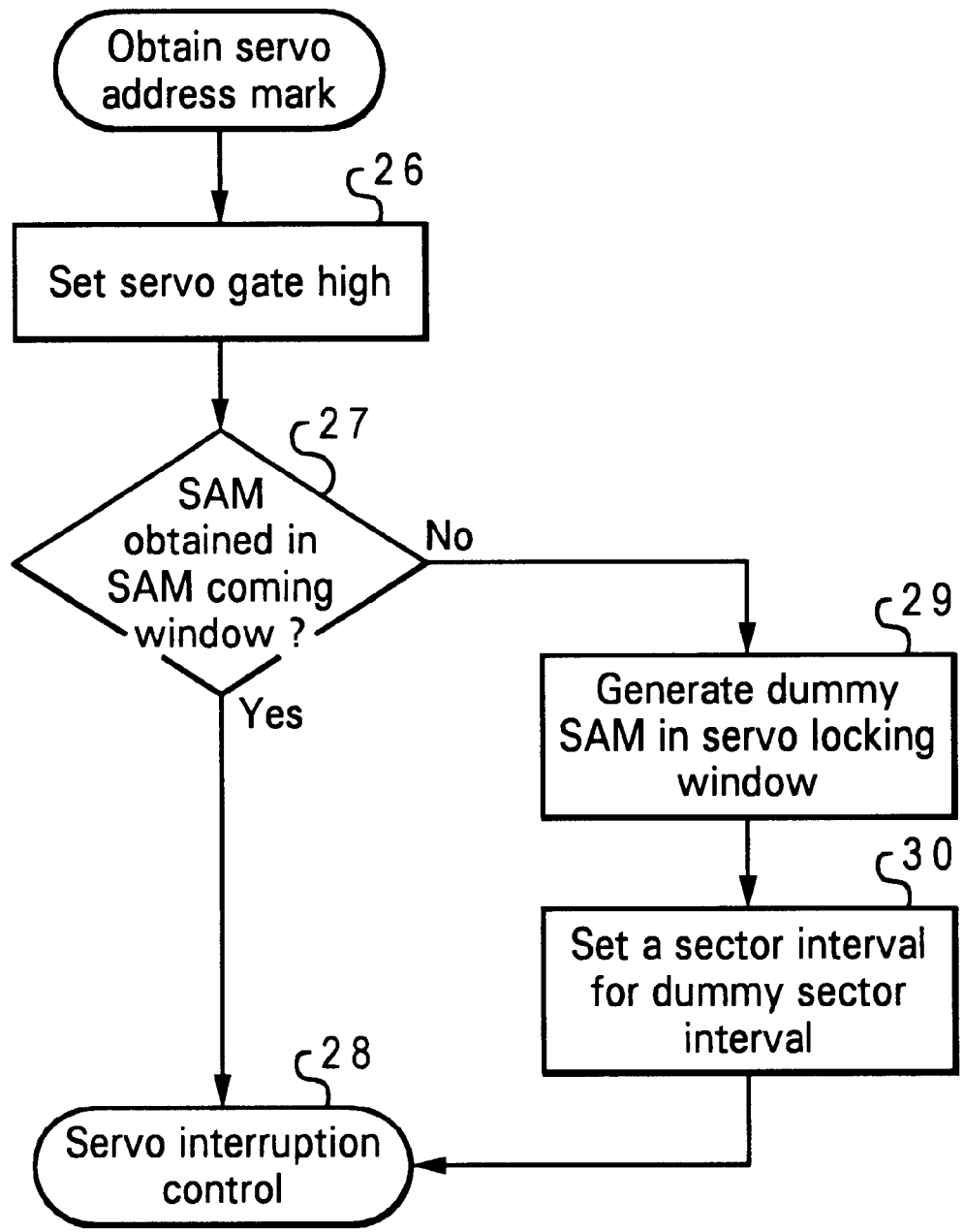
FIG. 3 depicts a high-level logic flowchart diagram illustrating the process for controlling a servo interruption in accordance with a preferred embodiment of the present invention.

With reference now to FIG. 3, there is depicted a high-level logic flowchart diagram illustrating the process for controlling a servo interruption. In order to receive a SAM, servo logic means 17 sends a servo gate signal to servo channel 9, as depicted in step 26. The servo channel is activated when the servo gate is driven to a logic high level. If the smf signal is obtained, which indicates the receipt of a SAM, within a predetermined time frame (SAM coming window), a servo interruption signal that starts the control of the servo is issued, as illustrated in step 28. If the smf signal is not obtained, as depicted in step 27, a dummy SAM is generated, as illustrated in step 29.

Figure 4:
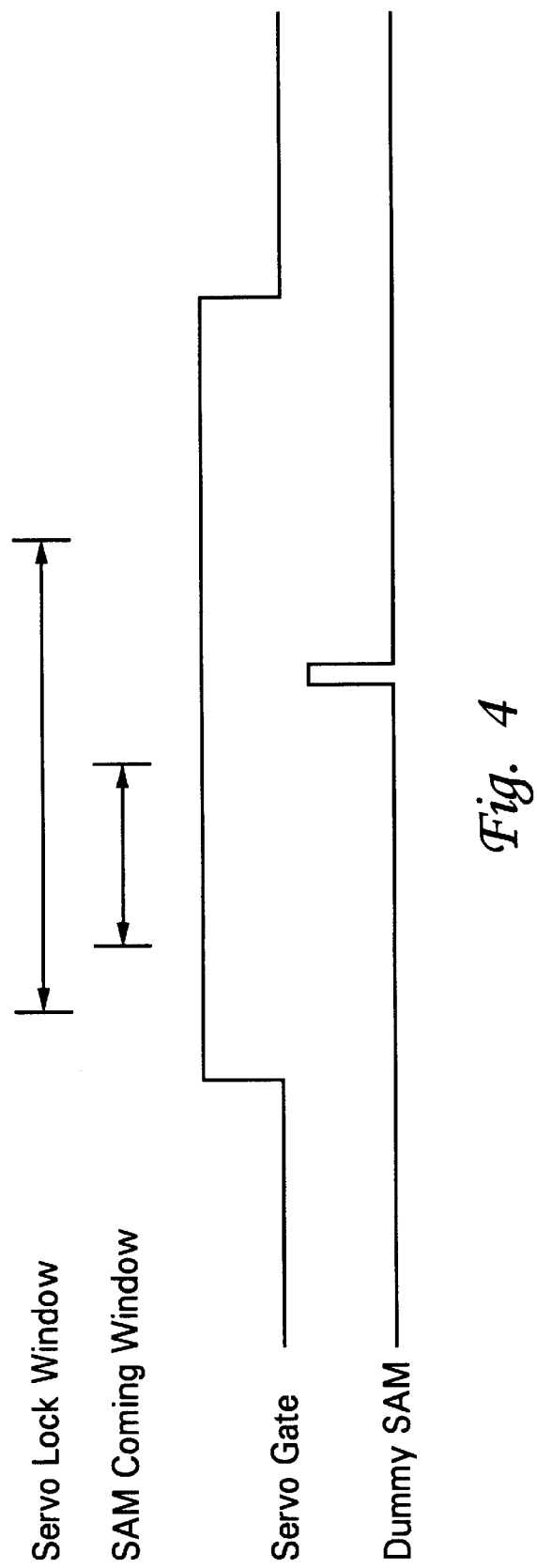
FIG. 4 illustrates a timing chart diagram depicting the timing required for the generation of a dummy servo address mark (SAM) in accordance with a preferred embodiment of the present invention.

The dummy SAM, as shown in FIG. 4, is generated in the servo lock window. Because the dummy SAM is generated in the servo lock window, the servo lock is never unlocked. In addition, if a servo unlock is never detected, the servo gate is opened normally for reading the next sector. Consequently, a dummy SAM is utilized only for an error sector. If a dummy SAM is utilized, a time interval is required to determine when to generate the dummy SAM. The timing is delayed due to the extra time required to generate the dummy SAM to enable control of a servo interruption. And, the original timing required to control a servo interruption is also utilized to open the servo gate for reading the next SAM, so a dummy interval shorter than the original one is utilized as a sector interval, as illustrated in step 30. A servo interruption signal is generated by a dummy SAM, so that the servo interruption control initially follows an identical step to a normal time control step, as depicted in step 28.

In a preferred embodiment of the present invention, control of the servo performed by issuing servo interruption signals regularly utilizing a dummy SAM even when a SAM cannot be read. Consequently, the head can correctly seek a position with a high possibility of success due to the estimation of the track position from a previously correctly read track position utilizing status estimating means 22 in concert with the dummy SAM. This is why the possibility for following up the correct track position becomes higher when the VCM is neutralized to enter the servo pattern search mode. It is possible to read the next SAM even when the reading ends in failure due to an unexpected factor in the previous time, so that there is a higher possibility for the normal operation to be restored. The control method in a preferred embodiment of the present invention is characterized by utilizing a dummy SAM during a fast seek operation.

Figure 5:
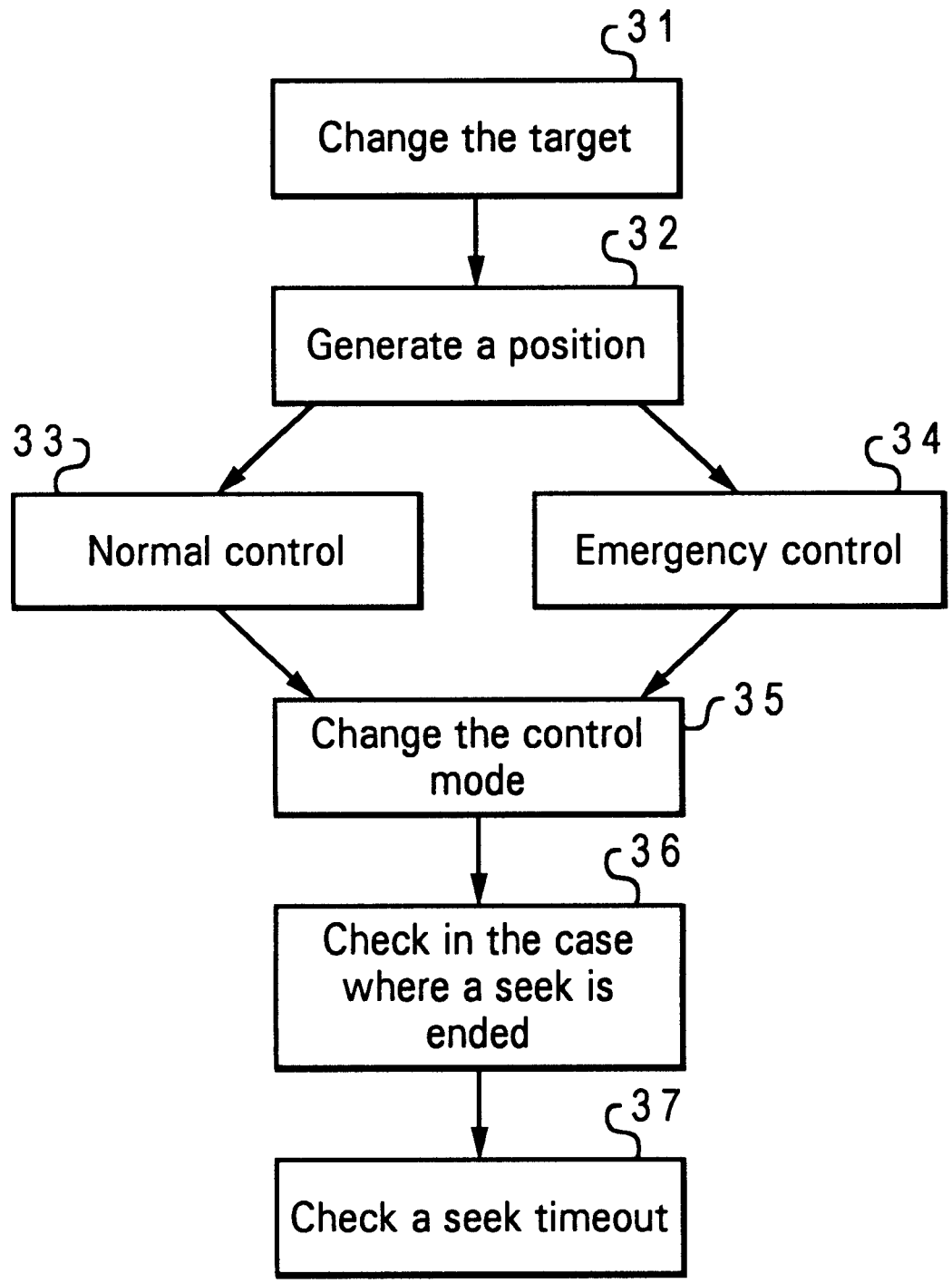
FIG. 5 depicts a high-level logic flowchart diagram for illustrating the process for controlling servo interruption when a servo interruption signal is issued in accordance with a preferred embodiment of the present invention.

With reference to FIG. 5, there is depicted a high-level logic flowchart diagram of a schematic controlling operation for a servo interruption when a servo interruption signal is issued. The target is changed in response to a command from the MPU 23, as illustrated in step 31. This target change is intended to change a target track position to be followed by the head in response to a command from the host or MPU 23. If a target track position is changed, an optimized operation is selected to minimize the seek time required to move the head to the target track position. And, various processes (e.g., an error recovery process) may be executed until control goes to the next step for generating a track position.

Next, the current position data of the head is generated, as depicted in step 32. This position generation generates raw position data based on the servo data obtained from the servo channel and the estimated position data is obtained from status estimating means 22. The data to be generated by these processes include velocity data obtained according to a difference between the last position data and the current position data, acceleration data obtained according to a difference between the last velocity data and the current velocity data. Utilizing estimated position data or raw position data is selectable according to the deviation between the estimated value and the raw data, as well as the operation mode.

Next, either the normal control process, as depicted in step 33, or the emergency control process, as illustrated in step 34, is performed according to the current control mode. The control mode is determined at the last servo interruption process. The normal control mode may be divided into multiple stages as a velocity control mode in which the head is in the velocity control state, a setting mode in which the head is being settled in the target track, a track following mode in which the head is following a target track according to a difference between the target track and the current position. If the servo control process is performed in multiple stages, the optimized control parameter can be selected according to each of those control modes, thereby optimizing the servo control process. The emergency servo control process will be described later in detail.

Next, the control mode is changed, as depicted in step 35. The steps in the control mode change step will be described later in detail. A seek completion check is performed, as illustrated in step 36. Then, a seek timeout check is performed, as depicted in step 37. The seek completion check process detects and relays a state of the head that is following a track, thereby enabling data to be read/written from/on a magnetic disk. A seek completion signal can be issued after the head's following state is recognized in multiple servo interruption processes utilizing a counter. The seek timeout check is terminated with a seek error message issued when no seek completion signal is issued after a predetermined time is up.

Figure 6:
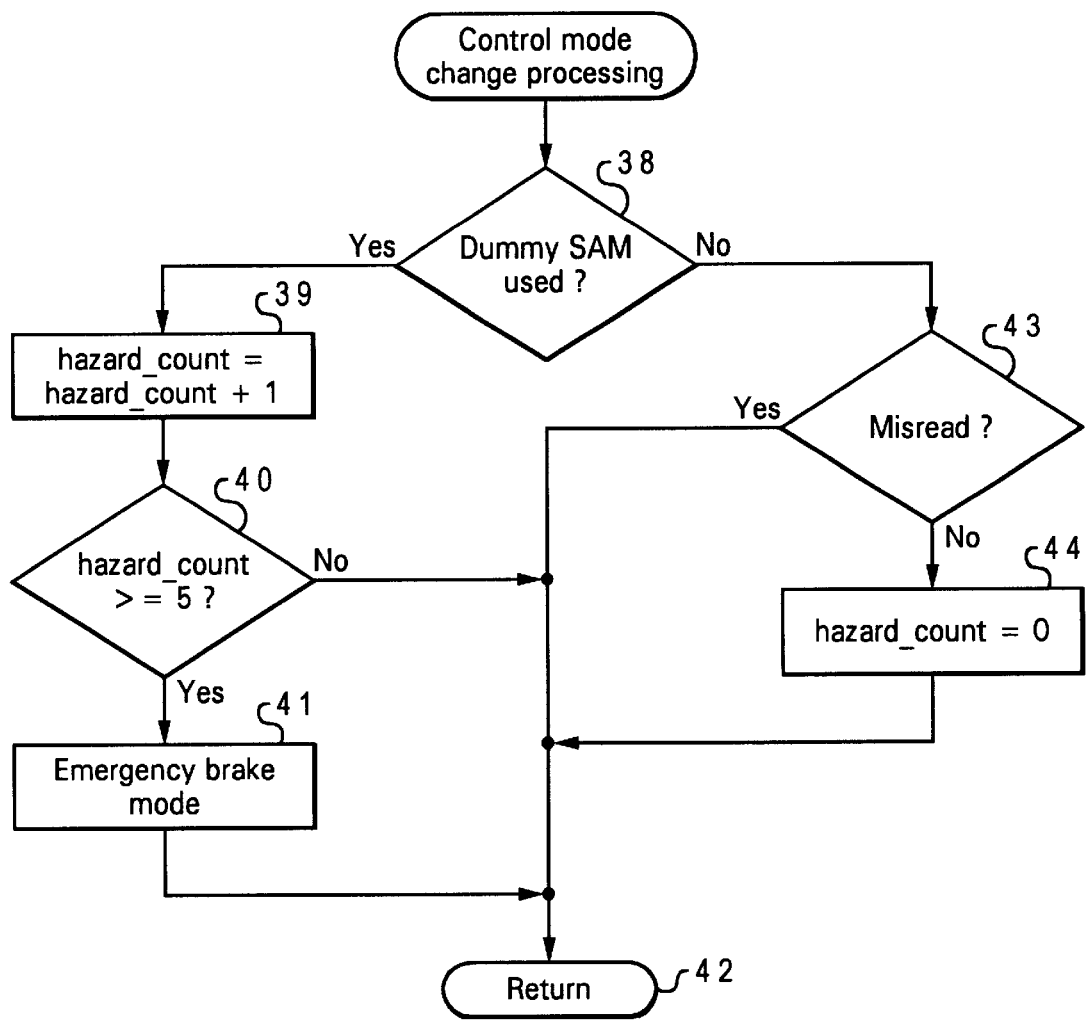
FIG. 6 illustrates a high-level logic flowchart diagram for depicting the process for a control mode change in accordance with a preferred embodiment of the present invention.

Referring to FIG. 6, there is shown a high-level logic flowchart diagram for determining whether or not to change the control mode. Assume now that the current control mode is a normal servo control process. In this servo interruption process, whether or not a dummy SAM is utilize is determined, as depicted in step 38. When a dummy SAM is used, as illustrated in step 39, the hazard counter value is increased by one, and whether or not the hazard counter value is five or greater is determined, as shown in step 40. In this case, the reference value of the hazard counter is set as "5," but it should be readily apparent that the value may be varied. If the hazard counter value is five or greater, the control mode is changed to the emergency brake control mode, as depicted in step 41, then the control mode change is terminated, as illustrated in step 42. If the hazard counter value is not five or greater, no control mode change is done and the process is terminated, or the normal control process is unchanged, as depicted in step 42.

If no dummy SAM is utilized, whether or not a Gray code is misread is determined, as illustrated in step 43. The Gray code misread process will be described later. If a Gray code has been misread, the control mode change is terminated and the current control mode is continued while the hazard counter value is kept at the current value, as depicted in step 42. And, when no Gray code is misread (that is, the process is executed without an error), the hazard counter value is reset to zero, as shown in step 44, then the control mode change is terminated, so that the current control mode is continued, as illustrated in step 42. If every SAM is read normally and no Gray code is misread, the operation is determined to be normal, and the hazard counter value is reset to zero. If a SAM is read normally and a Gray code is misread, then the status cannot be regarded as "normal." The current hazard counter value is left unchanged. If a SAM is not read normally, the status is evidently abnormal. The hazard counter value is thus increased. However, the emergency braking process is not activated immediately. The emergency mode is set when the hazard counter value exceeds a predetermined value. In the servo control method, it is expected that the failure might be accidental and the servo pattern might be read normally later even when reading of the SAM ends in failure a few times. In this case, the hazard counter value is not reset. If an error actually occurs, the error appears as a hazard counter value that exceeds the predetermined value. Thus, control mode can go into the emergency brake mode to enable the error process to be executed safely.

If a dummy SAM is utilized, as illustrated in step 43, the hazard counter value is handled as described above. However, the hazard counter value may also be incremented when the safety margin is increased for the servo control process. Otherwise, the hazard counter value may be increased by two when a dummy SAM is utilized and by one when a Gray code is misread.

Figure 7:
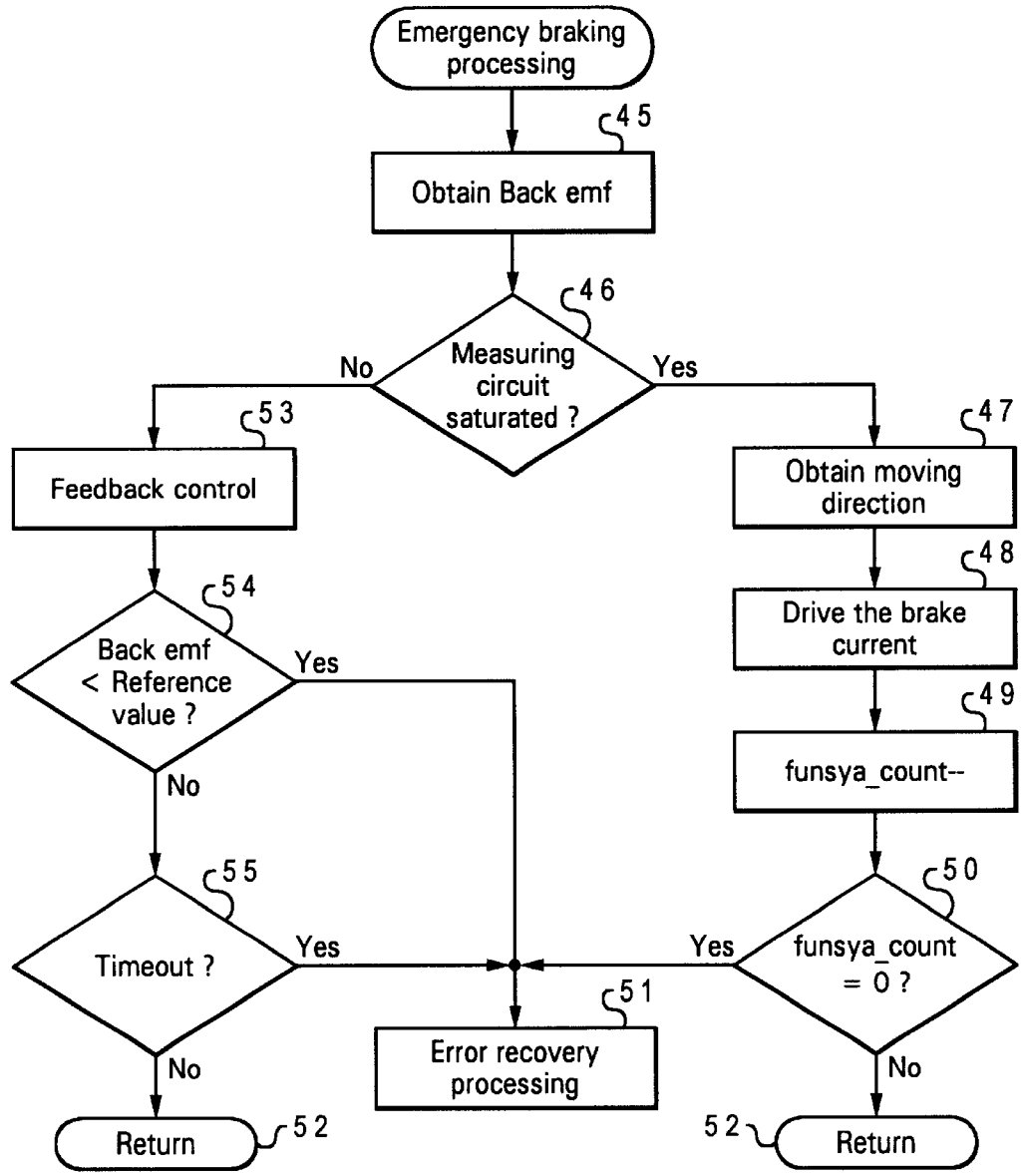
FIG. 7 depicts a high-level logic flowchart diagram for illustrating the process for an emergency braking in accordance with a preferred embodiment of the present invention.

With reference to FIG. 7, there is illustrated a high-level logic flowchart diagram of the emergency braking process. If there is a mode change in the last servo interruption process (e.g., when the control mode is changed to the emergency control mode) control goes to the emergency control mode, after the position data is generated, in the next servo interruption process.

At first, an output value is obtained from back emf monitor 7, as shown in step 45, and it is determined whether or not the measuring circuit is saturated, as illustrated in step 46. If the measuring circuit is saturated, the direction that the head is moving is determined from the polarity of the output, as depicted in step 47. And, the polarity of the brake current to be applied to the VCM is determined according to the direction the head is moving, resulting in the driving of the braking current, as illustrated in step 48. At this stage, the velocity of the head cannot be determined, so the brake is driven by a predetermined current value and an application time (e.g., 1A and 3.2 msec as absolution values). The predetermined velocity value is determined by taking a velocity that is at least enough to saturate the back emf monitor, VCM, and the components of the actuator. Next, the backward drive counter (funsha_count) value is decreased by one, as illustrated in step 49, and whether or not the backward drive counter value is zero is determined, as depicted in step 50. The backward drive counter value can be determined by multiplying the current velocity value by a proper factor. If the backward drive counter value is zero, a predetermined deceleration process must be performed. An error recovery process is thus executed, as illustrated in step 51. In this error recovery process, a seek error report is issued. If the backward drive counter value is not zero, the emergency brake process is terminated, and then the normal servo interruption processing is executed, as shown in step 52. According to a preferred embodiment of the present invention, the control method includes a servo interruption process that is performed even during an emergency braking process to repeat seek operations. In some cases, the servo pattern is read during this seek operation. In this state, the emergency braking process is exited and the normal control process can be restored. There is a possibility that the normal control process is restored even after the emergency control process begins. A seek error signal is issued only when the normal control process cannot be restored. The head velocity is decreased to avoid unrecoverable damage even when the head runs against the crush stop mechanism.

If the measuring circuit is not saturated, the output value from the back emf circuit controls the head position utilizing feedback control, as illustrated in step 53. After the predetermined control process, it is determined whether or not the output value from the back emf circuit is less than a predetermined reference value, as depicted in step 54. If the output value is less than predetermined reference value, the head velocity is decreased so that an error recovery process is executed, as illustrated in step 51. If the output value is greater than the reference value, it is determined whether or not a timeout is detected, as shown in step 55. If a timeout is detected, an error recovery process is executed, as illustrated in step 51. If a timeout is not detected, the emergency braking is terminated to return to the normal servo interruption process, as depicted in step 52. If the output value from the back emf circuit can be used, feedback control is enabled. The normal control state can thus be restored.

Figure 8:
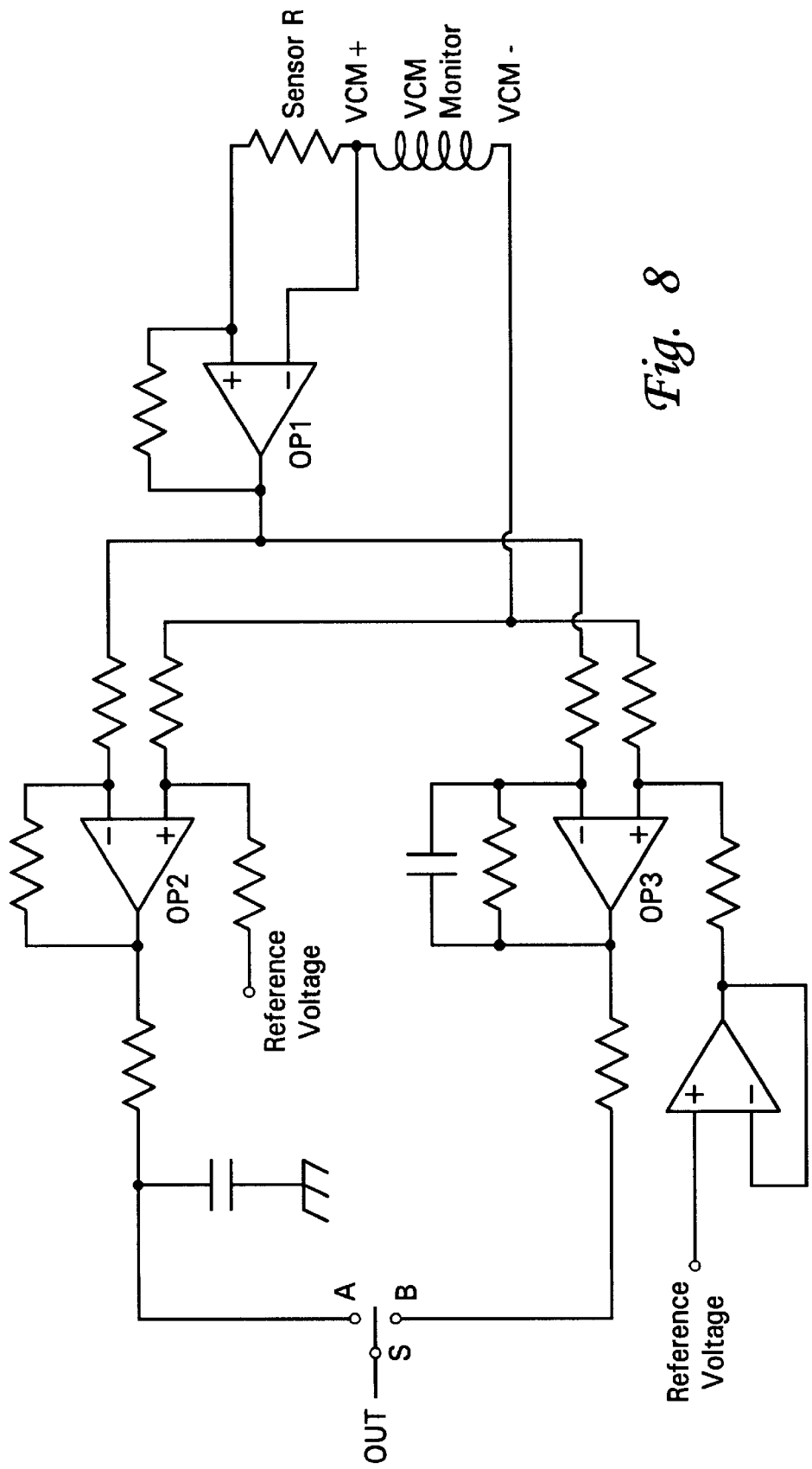
FIG. 8 illustrates a circuit diagram of a back electromotive force (emf) monitor in accordance with a preferred embodiment of the present invention.

With reference to FIG. 8, there is depicted a circuit diagram of back emf monitor 7. A current flowing in the VCM monitor is converted to a voltage via a sensor R, then the end-to-end voltage of this sensor R is amplified in a first stage amplifier OP1. Two amplifiers OP2 and OP3 that receive the output from OP1 are back emf circuits utilized for the conventional loading/unloading mechanism that has employed OP2. When the head is loaded/unloaded on/from the ramp, a switch S is coupled to a terminal A to obtain the output OUT. OP3 is a circuit employed for the control method according to a preferred embodiment of the present invention. Part of the back emf circuit for the loading/unloading mechanism is diverted. The full scale can be altered by adjusting the value of the element that includes the negative feedback circuit of OP3 and the value of the resistor element connected to the minus input side.

As described above, the subject servo interruption process (servo control) is continued utilizing a dummy SAM even when a servo pattern (a SAM, a Gray code, and burst data) cannot be read. And, if a SAM that cannot be read is continued over a predetermined frequency count, an emergency braking process is executed to issue a seek error signal. With the control method of the present invention, the normal servo controlling has a high probability of being restored, since a SAM can be read next time even when reading of the SAM ends in failure. In addition, because the normal servo controlling has a high probability of being restored even during an emergency braking process, the seek error occurrence rate can be lowered. And, when a seek error occurs, an error can be processed while the head velocity is reduced. It is thus possible to reduce the occurrence of the damage to be caused by an overrun and rebound of the head on the surface of the magnetic recording medium.

Figure 9:
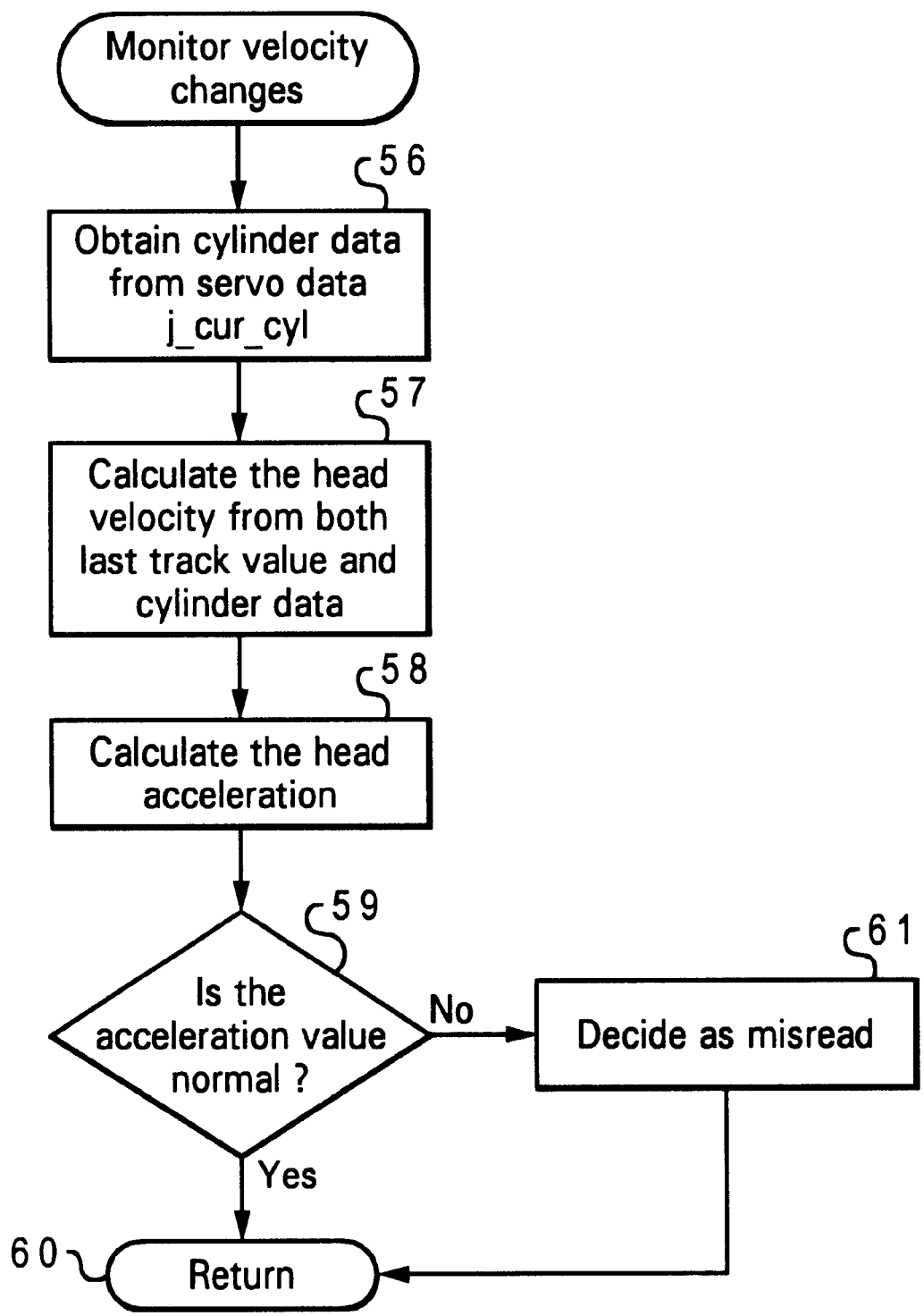
FIG. 9 depicts a high-level logic flowchart diagram illustrating the process executed in velocity change monitoring means in accordance with a preferred embodiment of the present invention.

Referring now to FIG. 9, there is depicted a high-level logic flowchart diagram depicted a process executed in the velocity change monitoring means. At first, raw cylinder data (head position) is obtained from servo data, as illustrated in step 56. Then, the current head velocity is calculated from a difference between the last track value (head position) and the current raw cylinder data (head position), as depicted in step 57. As shown in step 58, the current head acceleration is calculated from the difference between the last head velocity and the current head velocity. Generally, the upper limit (absolute value) of the head acceleration is almost determined by the characteristics of the actuator. A determination of whether or not the obtained acceleration value is normal is made, as illustrated in step 59. If the acceleration is within a predetermined normal value range, the velocity change monitoring is terminated, as shown in step 60. If the acceleration is not within the normal value range, it is determined that the reading that has obtained the cylinder value is misread, as depicted in step 61. Then, the-velocity change monitoring is terminated, as illustrated in step 60. This misread information is utilized in the above described control mode change.

Figure 10:
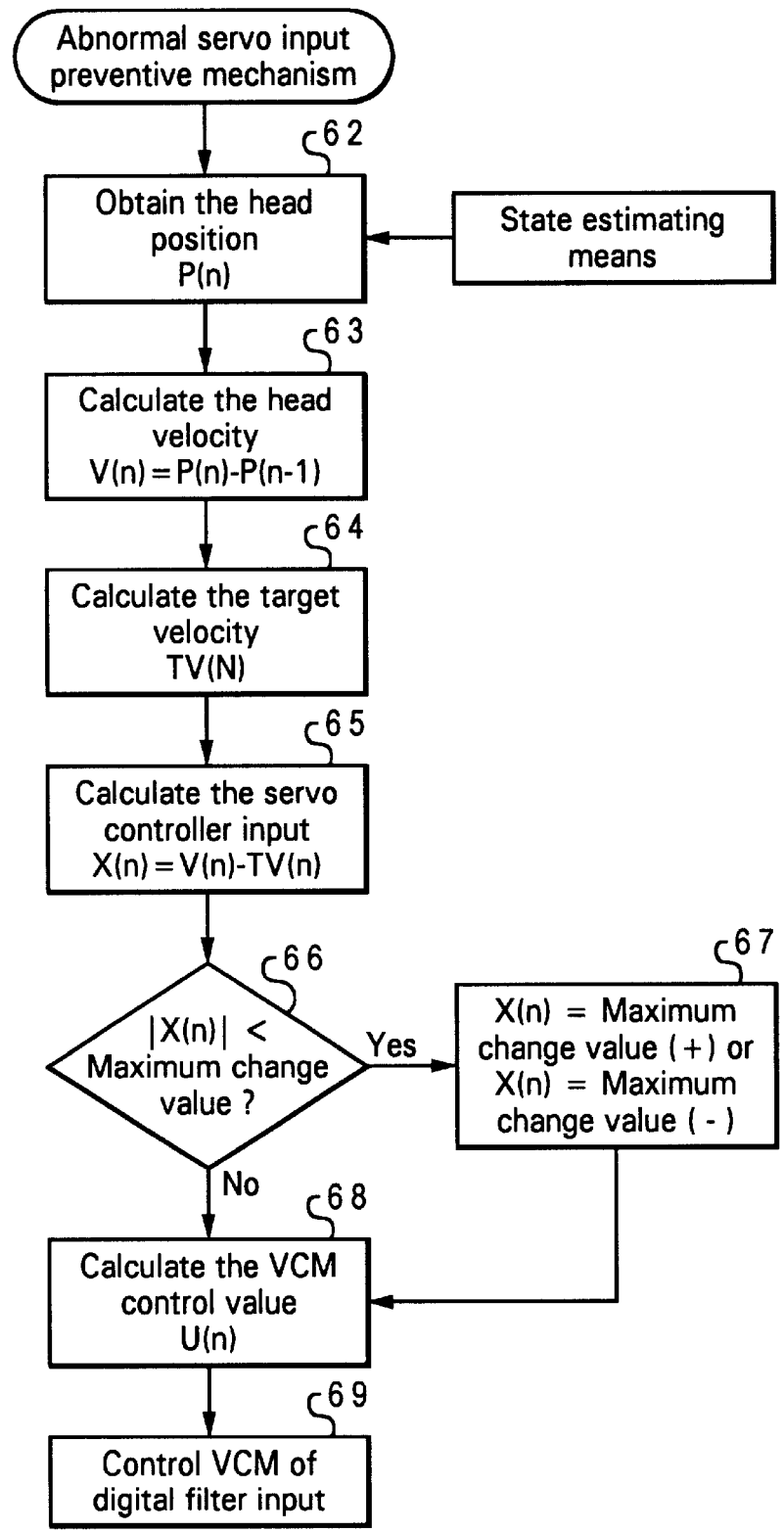
FIG. 10 illustrates a high-level logic flowchart diagram depicting an abnormal servo input preventive process in accordance with a preferred embodiment of the present invention.

With reference to FIG. 10, there is depicted a high-level logic flowchart diagram illustrating an abnormal servo input preventive process. At first, a head position is obtained, as depicted in step 62. Then, information obtained from the state estimating means is added to the head position. The current head position is represented as P(n). The current head velocity V(n) is calculated from the last head position P(n−1), as shown in step 63. The calculation is done as V(n)=P(n)−P(n−1). And, the target velocity TV(n) at the place is calculated using a track calculating function that assumes a distance to the target track as an input, as depicted in step 64. A servo controller input value X(n)=V(n)−TV(n) is calculated from V(n) and TV(n), as illustrated in step 65. It is determined whether or not the absolute value X(n) of exceeds the maximum change value, as shown in step 66. If the maximum change value is exceeded, the polarity is taken into consideration to substitute the maximum change value for X(n), as illustrated in step 67. If the maximum chance value is not exceeded, the X(n) value is utilized without change. After this, the VCM control value U(n) is calculated, as depicted in step 68. The result will become U(n)=U(n−1)+Y(n), Y(n)=−k1'X(n)−k2'X(n−1) −k3'Y(n−1)−k4'Y(n−2). k1 to k4 are constant values selected properly for each control mode set at that time. Then, U(n) is entered to a digital filter to control the VCM, as illustrated in step 69. Because the input X(n) is limited such way, discontinuous input values to the VCM are suppressed. Consequently, generation of abnormal sounds and vibrations from the VCM can be suppressed.

Figure 11:
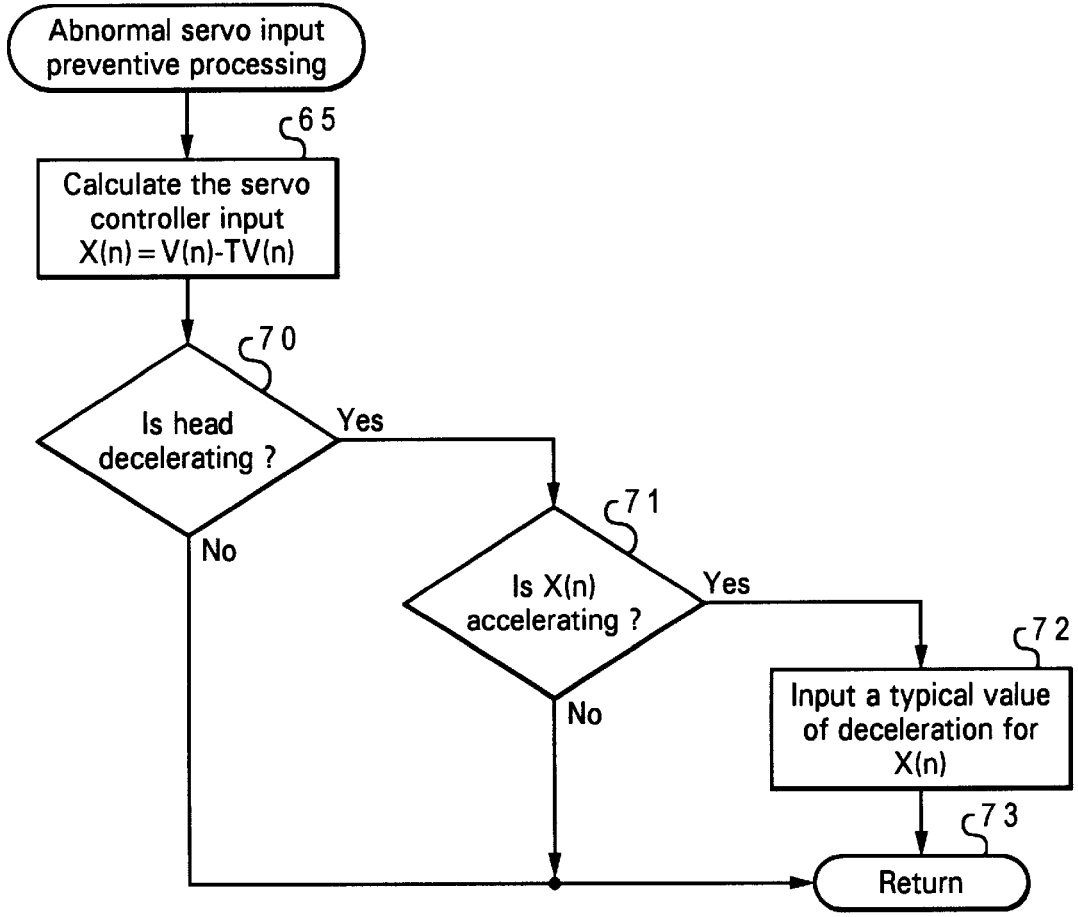
FIG. 11 depicts a high-level logic flowchart diagram illustrating an abnormal servo input preventive process in accordance with another preferred embodiment of the present invention.

Referring now to FIG. 11, there is depicted a process for suppressing an abnormal servo input according to another preferred embodiment of the present invention. Similar to FIG. 10, an input to the servo controller is calculated initially, as shown in step 65, to decide whether or not the head is decelerating, as illustrated in step 70. If the head is decelerating, it is determined whether or not the X(n) value denotes an accelerating state, as depicted in step 71. If the value denotes an accelerating state, a typical value for decelerating the head is entered to X(n), as illustrated in step 72. The normal servo controlling is thus restored, as depicted in step 73. Because a value for accelerating the head is entered to the servo controller while the head is decelerating is an abnormal state, the input value is replaced with another input value for decelerating the head. A typical value is selected as the input value for decelerating the head. The typical value is determined to be the most representative value through a test, according to the characteristics of both actuator and VCM. The value might not be the optimal one, but the input value is a proper representative value at this time. Because an abnormal input is detected and replaced with a normal value, the VCM can be controlled smoothly, thereby suppressing the generation of both abnormal sound and abnormal vibration.

Furthermore, sometimes an improper value is read and entered into the state estimating means, although the process is not illustrated here. Despite the reading of an improper value, the input value can be limited, which keeps the inner state values of the state estimating means in a favorable predetermined range.

Figure 12:
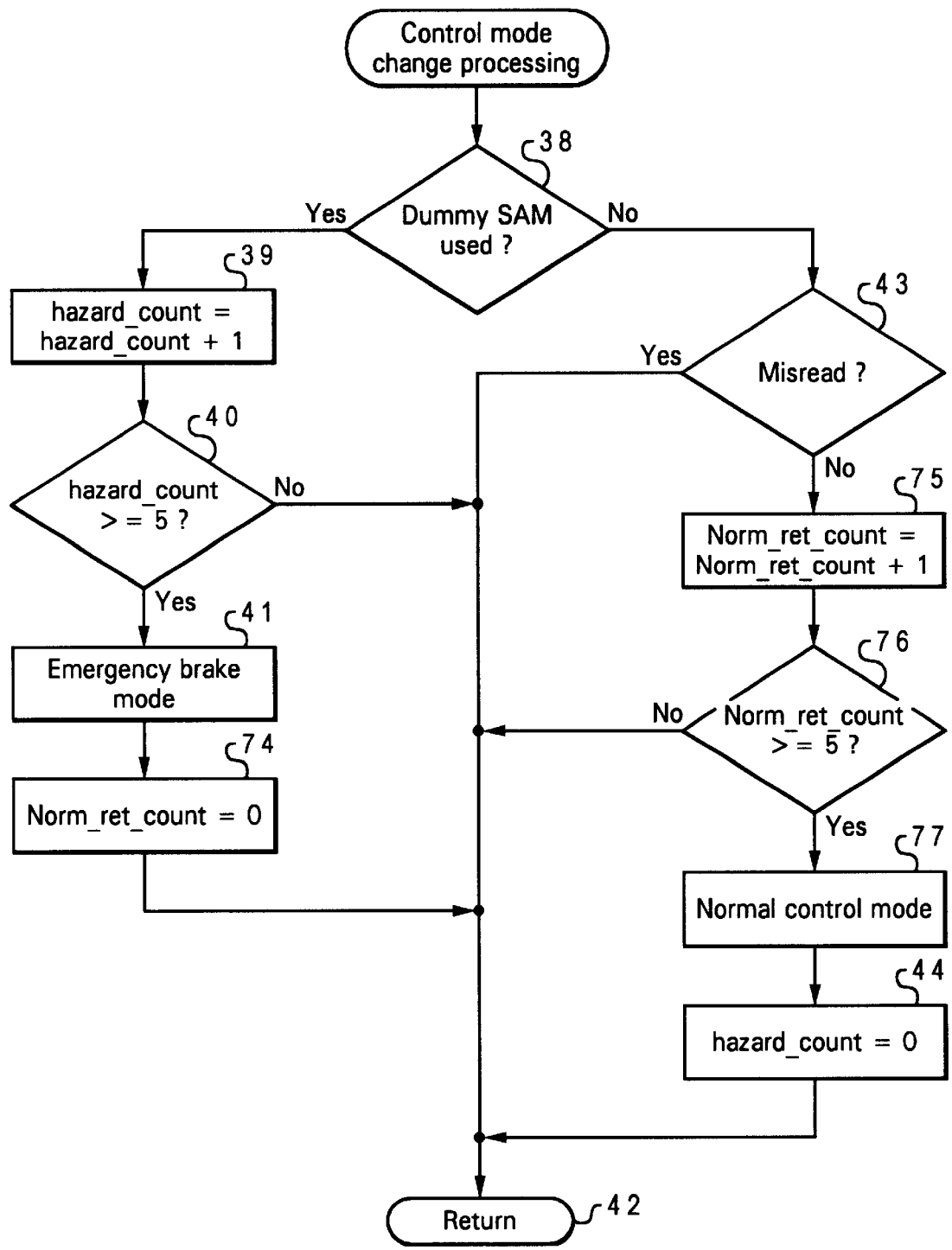
FIG. 12 illustrates a high-level logic flowchart diagram depicting a control mode change process in accordance with another preferred embodiment of the present invention.

With reference to FIG. 12, there is illustrated a high-level logic flowchart diagram depicting the control mode change process according to another preferred embodiment of the present invention. As illustrated in FIG. 12, a normal control return counter (Norm_ret_count), shown in step 74, can be employed. The value of this normal control return counter is reset to zero, as illustrated in step 74 when the emergency braking mode is called, as depicted in step 41. Then, the emergency braking control state mode is invoked after the next servo interruption process. If both SAM and Gray code are read normally (e.g., a misread is detected, as depicted in step 43) during servo pattern reading in the emergency braking mode, the value of the normal control return counter is increased by one, as shown in step 75. It is determined whether or not the return counter value is equal to or greater than five, as shown in step 76. If the return counter value is less than five, the control state is determined to be not stable enough to restore the normal control. The servo control is thus continued in the subsequent processes in the emergency braking mode, as illustrated in step 42. If value of the control return counter is greater than or equal to five, the control state is determined to be stable enough. The normal control mode is thus set, as depicted in step 77, and the value of the hazard counter is reset to 0, as illustrated in step 44, and the servo control process is continued, as shown in step 42. With the control process employed, it is possible to prevent the return to the normal control mode due to accidental reading of a servo pattern when the normal control mode is restored from the emergency braking mode. Because the normal control is restored only when the head condition is stabilized and an irregular return to the normal control in an emergency is prevented, an unexpected head crush can be prevented. In the above example, the reference value of the control return counter is set as 5, but the reference value can be varied freely, of course.

As previously discussed, the present invention a hard disk drive to remain in a normal reading state even when the data read of a SAM fails. The method of the present invention can prevent the head from running against the crush stop or ease the running of the head against the crush stop or to reduce the force of the collision of the head against the crush stop to help prevent unrecoverable damage on the surface of the medium. The present invention suppresses abnormal sounds or vibration from the VCM.

While the invention has been particularly shown and described with reference to a preferred embodiment, it will be understood by those skilled in the art that various changes in form and detail may be made therein without departing from the spirit and scope of the invention.

What is claimed is:

1. A memory device including a memory medium including at least a set of position information, a medium drive means for driving said memory medium, a read/write structure including a head coupled to an arm, and a read/write structure drive means for driving said read/write structure, said memory device comprising:

means for reading a marker signal of said position information from said head;

means for generating a dummy marker signal, in response to a marker signal read failure;

means for executing an interruption of said read/write structure drive means, in response to receiving either said marker signal or said dummy marker signal;

means for counting said interruptions by counting said dummy marker signal;

means for determining if a count value from said counting exceeds a predetermined value;

means for measuring an output from said read/write structure drive means, said output determines a direction said read/write structure is moving; and means for providing said sending said read/write structure drive means with a drive force in a direction opposite to said direction said read/write structure is moving, in response to determining said count value exceeds a predetermined value.

2. The memory device according to claim 1, wherein said read/write drive means is a voice coil motor and said output value is a measure of a back electromotive force (emf) of said voice coil motor.

3. The memory device according to claim 2, further comprising:

means for monitoring said back emf; and means for controlling said drive force utilizing said output value in a feedback loop.

4. The memory device according to claim 1, further including:

means for determining an acceleration of said head; and means for determining whether or not said acceleration exceeds a predetermined value if a set of address information of said position information is misread, wherein said means for counting is not reset during the process of said interruption if said set of address information is misread.

5. The memory device according to claim 4, further comprising:

means for counting a misread of said address information; and means for providing said read/write structure drive means with a drive force in a direction opposite to said direction said read/write structure is moving, in response to determining a count value output by said means for counting a misread exceeds a predetermined value.

6. The memory device, according to claim 1, further comprising:

a state estimating means for estimating a current position of said head;

means for designating said estimated current position as a head position if a deviation from a current head position read by said head exceeds a predetermined value; and means for determining address information misread when a corrected input to said state estimating means exceeds a predetermined value, wherein said means for counting said interruptions by counting said dummy marker signal is not reset while processing said interruption of said read/write structure drive means if said address information misread occurs.

7. The memory device according the claim 6, further including:

means for counting a misread of said address information; and means for providing said read/write structure drive means with a drive force in a direction opposite to said direction said read/write structure is moving, in response to determining a count value output by said means for counting a misread exceeds said predetermined value.

8. The memory device according to claim 1, further comprising:

means for calculating an input value to said read/write structure drive means from said address information from said position information read by said head and another address information from a last said interruption of said read/write structure drive means, wherein said means for calculating an input value limits said input value within a predetermined range.

9. The memory device according to claim 1, further including:

means for calculating an input value to said read/write structure drive means from said address information from said position information read by said head and another address information from a last said interruption of said read/write structure drive means; and means for determining whether or not said head is decelerated by said read/write structure drive means, and in response to determining said head is decelerated by said read/write structure drive means and said input value is a accelerating input value, replacing said accelerating input value with a decelerating input value calculated by said means for calculating an input value.

10. The memory device according to claim 1, wherein said memory device is a hard disk drive including a loading/unloading mechanism.

11. A method for controlling a memory device including a memory medium including at least a set of position information, a medium drive means for driving said memory medium, a read/write structure further including a head coupled to an arm, and a read/write structure drive means for driving said read/write structure, said memory device comprising:

reading a marker signal of said position information from said head;

generating a dummy marker signal, in response to a marker signal read failure;

executing an interruption of said read/write structure drive means, in response to receiving either said marker signal or said dummy marker signal;

counting said interruptions by counting said dummy marker signal;

determining if a count value from said counting exceeds a predetermined value;

measuring an output from said read/write structure drive means, said output determines a direction said read/write structure is moving; and providing said sending said read/write structure drive means with a drive force in a direction opposite to said direction said read/write structure is moving, in response to determining said count value exceeds a predetermined value.

12. The method according to claim 11, further including:

measuring an output from said read/write structure drive means, said output determines a direction said read/write structure is moving, wherein said read/write drive means is a voice coil motor and said output value is a measure of a back electromotive force (emf) of said voice coil motor.

13. The method according to claim 12, further comprising:

monitoring said back emf; and controlling said drive force utilizing said output value in a feedback loop.

14. The method according to claim 11, further including:

determining an acceleration of said head; and determining whether or not said acceleration exceeds a predetermined value if a set of address information of said position information is misread, wherein a counting said interruptions by counting said dummy marker signal is not reset during the process of said interruption if said set of address information is misread.

15. The method according to claim 14, further comprising:

counting a misread of said address information; and providing said read/write structure drive means with a drive force in a direction opposite to said direction said read/write structure is moving, in response to determining a count value output by a means for counting a misread of said address information exceeds said predetermined value.

16. The method according to claim 11, further comprising:

estimating a current position of said head;

designating said estimated current position as a head position if a deviation from a current head position read by said head exceeds a predetermined value; and determining address information misread when a corrected input to a state estimating means exceeds a predetermined value, wherein a means for counting a misread of said address information is not reset while processing said interruption of said read/write structure drive means if said address information misread occurs.

17. The method according the claim 16, further including:

counting a misread of said address information; and providing said read/write structure drive means with a drive force in a direction opposite to said direction said read/write structure is moving, in response to determining a count value output by a means for counting a misread of said address information exceeds said predetermined value.

18. The method according to claim 11, further comprising:

calculating an input value, limited by a predetermined range, to said read/write structure drive means from said address information from said position information read by said head and another address information from a last said interruption of said read/write structure drive means.

19. The method according to claim 11, further including:

calculating an input value to said read/write structure drive means from said address information from said position information read by said head and another address information from a last said interruption of said read/write structure drive means; and determining whether or not said head is decelerated by said read/write structure drive means, and in response to determining said head is decelerated by said read/write structure drive means and said input value is a accelerating input value, replacing said accelerating input value with a decelerating input value calculated by a means for calculating an input value.

* * * * *